United States Patent [19]
Kruis et al.

[11] 3,899,312
[45] Aug. 12, 1975

[54] EXTRACTION OF ODORIZING SULFUR COMPOUNDS FROM NATURAL GAS AND REODORIZATION THEREWITH

[75] Inventors: August Kruis; Heinz Karwat, both of Pullach, Germany

[73] Assignee: Linde Aktiengesellschaft Zentrale Patentabteilung, Munich, Germany

[22] Filed: Aug. 18, 1970

[21] Appl. No.: 64,757

[30] Foreign Application Priority Data
Aug. 21, 1969 Germany............................ 1942639

[52] U.S. Cl. ............................ 62/17; 62/20; 55/73; 48/195
[51] Int. Cl. ................................................ F25j 3/00
[58] Field of Search ................ 55/73; 62/17, 20, 29; 260/609 C; 48/195

[56] References Cited
UNITED STATES PATENTS

| | | | |
|---|---|---|---|
| 2,094,270 | 9/1937 | Hampton | 48/195 |
| 2,309,654 | 2/1943 | Leum | 260/609 C |
| 2,430,269 | 11/1947 | Bell | 260/609 C |
| 2,452,040 | 10/1948 | Drennan | 260/609 C |
| 2,455,656 | 12/1948 | Cauley | 260/609 C |
| 3,122,189 | 11/1963 | Elliott | 48/195 |
| 3,324,627 | 6/1967 | Kohrt | 55/73 |

FOREIGN PATENTS OR APPLICATIONS

| | | | |
|---|---|---|---|
| 944,256 | 12/1963 | Germany | 55/73 |
| 728,444 | 4/1955 | United Kingdom | 55/73 |

*Primary Examiner*—Norman Yudkoff
*Assistant Examiner*—Frank Sever
*Attorney, Agent, or Firm*—Millen, Raptes & White

[57] ABSTRACT

In a natural gas liquefaction process comprising prior to the step of liquefying the natural gas, the preliminary steps of scrubbing the natural gas with a polar organic scrubbing agent such as methanol to remove $CO_2$ and $H_2O$ which would otherwise precipitate and concomitantly to remove odiferous organic sulfur compounds therefrom, and then in a separating step, adding water to resultant loaded scrubbing agent to form an aqueous phase and a hydrocarbon phase, the latter phase including hydrocarbons scrubbed out with said organic sulfur compounds, said latter compounds being distributed in both the aqueous and hydrocarbon phases, there is provided an improvement comprising adding additional liquid hydrocarbon such as pentanes and higher hydrocarbons, in said separating step, to said loaded scrubbing agent, in an amount to remove said organic sulfur compounds up to the amount required and to transfer said organic sulfur compounds to said hydrocarbon phase. The resultant hydrocarbon phase is then used to odorize the stored liquefied natural gas after re-evaporation. Preferred embodiments include two-stage scrubbing and the use of an extraction column.

17 Claims, 2 Drawing Figures

EXTRACTION OF ODORIZING SULFUR COMPOUNDS FROM NATURAL GAS AND REODORIZATION THEREWITH

BACKGROUND OF THE INVENTION

This invention relates to a process and apparatus for the removal of odorizing substances, mainly organic sulfur compounds, from natural gas by scrubbing the natural gas with an organic polar scrubbing agent, and especially to a system wherein the odorizing substances are recycled to natural gas after the latter has been substantially freed of $CO_2$ and $H_2O$.

It is conventional (German Pat. No. 1,222,198) to free gases, for example refinery waste gases or coke-oven gases, of impurities, especially sulfur compounds, resinogenous substances, and carbon dioxide, by treating these gases under pressure at temperatures of below 0° C. with one or more organic, predominantly polar, scrubbing agents, for example methanol.

These scrubbing agents, because they are readily handleable, inexpensive, and selective for the contaminants, have proven to be advantageous for many years in numerous gas separation plants all over the world. The scrubbing process is normally conducted under pressure and at temperatures which are as low as possible, approximately down to −70° C., since the solubility of gases, such as, for example, $CO_2$ or $H_2S$, is inversely proportional to the temperature of the scrubbing agents.

This conventional process can also be employed for the purification of natural gas which today is not only an extensively utilized fuel, but is also an important raw material for the chemical industry. Whereas the necessity of purification of natural gas for the latter purpose is apparent, such purification is also indispensable on the consumer side where natural gas is stored in liquefied state to meet peak demands. When the gas is liquefied, high-boiling components, such as $CO_2$, $H_2S$, and moisture must be separated beforehand; otherwise, such components would solidify and clog the pipelines.

Though this purification of natural gas appears simple, difficulties arise due to special circumstances. In a number of countries, including the United States of America, legal requirements prescribe that natural gas be odorized with strongly odoriferous substances when it is used for domestic purposes. Since natural gas, in most cases, does not contain any, or an insufficient amount of odor detectable components, it is conventional to add odorizing compounds, usually organic sulfur compounds, e.g. mercaptans, in low concentrations. The gas is odorized not only to detect leakage at the site of use, but also to detect leakage in the distribution network leading from the storage vessel; consequently, the gas is odorized before entering the distribution network.

Thus, the above-mentioned natural gas liquefaction plants, wherein natural gas is liquefied during periods of low demand and re-evaporated during peak demand and supplied to the consumers, in practice, employ only odorized natural gas for liquefaction. If the $CO_2$ and water contained in the natural gas are removed by a scrubbing step with a polar organic scrubbing agent before the natural gas is liquefied, then the odorizing substances which exhibit excellent solubility in the scrubbing agents, are also scrubbed out and pass, during the subsequent regeneration of the scrubbing agents, into the residual gas, i.e. into the waste gas of the regeneration process. The residual gas containing in addition, relatively high concentrations of $CO_2$ and $H_2O$ is, for practical purposes, not liquefied. Consequently, the odorizing substances are lost from the liquefied natural gas, and are present in the residual gas in an excessive concentration.

This anomalous problem is not resolved by the addition of water to the loaded scrubbing agent withdrawn from the scrubbing column. Though a phase separation is obtained of the hydrocarbons dissolved by the scrubbing agent during the scrubbing procedure, the organic sulfur compounds are only partially transferred to this hydrocarbon phase. This is so because the solubility of higher hydrocarbons, approximately starting with $C_5$, in polar organic scrubbing agents per se, and in particular under the compression of methane at the high pressures conventional for natural gas liquefaction, is unexpectedly substantially lower than the solubility of the sulfur compounds serving as odorizing substances.

To solve the above problem, if, on the one hand, the amount of scrubbing agent employed were to be adjusted to the amount of the sulfur compounds to be washed out, only a minor amount of the higher hydrocarbons would be washed out of the gas. However, this minor amount would be unable, with the addition of water to the loaded scrubbing agent, to absorb the odorizing substances to the desired extent, thereby permitting substantial quantities of odorizing substances to pass over into the residual gas of the regenerating process. On the other hand, if the amount of scrubbing agent were to be adjusted to obtain as complete a scrubbing out of the higher hydrocarbons as possible, then an inordinate amount of scrubbing agent — as determined by experience, 20 to 30 times — necessary for the removal of the odorizing substances proper would have to be utilized.

Ordinarily, the residual gas of the regeneration step is employed for heating purposes, but because of the excessive concentration of odorizing substances, the latter must be removed at least partially from this residual gas. For this purpose, conventional methods are employed, for example the separation of the odorizing substances by adsorption on activated charcoal, or the chemical reaction by means of oxidation catalysts. However, these methods entail additional process steps.

Furthermore, not only is it necessary for catalysts and adsorbents to be renewed from time to time, but it is also necessary to provide a sufficient quantity of odorizing agent to re-odorize the natural gas to a sufficient degree in the course of the re-evaporation of the natural gas from the liquefaction plant.

SUMMARY OF THE INVENTION

Relevant to the above-described problems, it is an object of the present invention to avoid the disadvantages of the prior art and to provide a system making it possible, with a minimum of expenditure in apparatus and process steps, to effect a removal of the odorizing substances accompanying the natural gas from its source and to recycle same to natural gas freed of $CO_2$, $H_2O$, and $H_2S$.

Upon further study of the specification and appended claims, other objects and advantages of the present invention will become apparent.

These objects are attained, according to the invention, by adding to the loaded scrubbing agent, in addition to water, such an amount of liquid hydrocarbons that there is obtained a practically complete removal of the organic sulfur compounds from the aqueous scrubbing agent phase. Both phases are then separated, and the organic sulfur compounds contained in the hydrocarbon phase are returned to the natural gas, as required. A preferred embodiment of the invention includes a special scrubbing operation.

DETAILED DISCUSSION OF THE INVENTION

In this invention, the separation of the organic sulfur compounds can be conducted in a scrubbing step, together with the separation of $CO_2$, $H_2O$, and $H_2S$ prior to the liquefaction of the natural gas. The loaded scrubbing agent which is then withdrawn from the scrubbing column is mixed with water and liquid hydrocarbons. The polar organic scrubbing agent, as well as $CO_2$ and $H_2S$ remain in the aqueous phase, while the organic sulfur compounds, i.e. the odorizing substances, because they exhibit a preferential solubility in hydrocarbons, transfer to the hydrocarbon phase.

According to the preferred embodiment of this invention, a preliminary scrubbing step is conducted wherein the odorizing substances are scrubbed out separately from the main amount of components such as $CO_2$ and $H_2S$. Such a preliminary scrubbing step takes advantage of the fact that the organic sulfur compounds exhibit a greater solubility in the scrubbing agent than $CO_2$ and $H_2S$, so that a substantially smaller quantity of scrubbing agent is sufficient to remove the odorizing substances from the gas. The amount of the scrubbing agent, in this connection, is adjusted so that it is just sufficient to remove the odorizing substances.

In this preferred embodiment of the invention, the utilization of poorly soluble higher hydrocarbons present in the natural gas is deliberately ignored, except for the small amount absorbed by the scrubbing agent. The odorizing substances are then substantially completely separated from the preliminarily obtained loaded scrubbing agent by the addition of water and liquid hydrocarbons. This provides the advantage that the residual gas formed during the regeneration of loaded scrubbing agent, for example by expansion, is obtained free of odorizing substances.

The addition of water to the loaded scrubbing agent exhibits several advantageous effects. Firstly, there is a minor reduction in the solubility of the substances absorbed by the scrubbing agent from the natural gas, especially of the odorizing agent, but also of $CH_4$, $CO_2$, and $H_2S$. This leads, on the one hand, to an easier transfer of the odorizing substances into the hydrocarbon phase, and, on the other hand, to a kind of preliminary regeneration of the scrubbing agent, since $CH_4$, $CO_2$, and $H_2S$ exit in the gaseous form during the addition of water. Moreover, by the addition of water to the loaded scrubbing agent, the dissolving power of the latter with respect to the subsequently added liquid hydrocarbon is reduced, so that less hydrocarbons pass over into the scrubbing agent phase.

The separation of the aqueous scrubbing agent phase from the hydrocarbon phase can be conducted in a simple settler, e.g. a separating vessel wherein a mixture of the two phases are introduced from above, form separate superimposed phases, the latter phase being withdrawn separately from each other.

In accordance with a more sophisticated and advantageous embodiment of this invention, the extraction of odorizing substances and separation of the two phases is conducted in an extraction column, wherein the hydrocarbons are introduced to the bottom of the column and ascend to the top of the column, countercurrently extracting the odorizing substances from the aqueous scrubbing agent previously introduced to the top of the column.

In this invention, it is preferred that the hydrocarbon phase, after the separation from the aqueous phase, be stored separately, so that during a period of high natural gas demand, it can serve as the source of odorizing substances. These odorizers are then added in metered amounts to the stored natural gas. According to the invention, the transfer of the odorizers can be effected by one of several ways. For example, part of the re-evaporated natural gas can be passed, as a stripping gas, through the liquid hydrocarbons, to convert the organic sulfur compounds, i.e. the odorizers to the gaseous phase, with the resultant mixture being recycled to the remainder of the re-evaporated natural gas. Alternatively, the mixing of the odorizers with the natural gas can also be accomplished by introducing the liquid hydrocarbons containing the odorizing substances in dissolved form, in metered amounts through nozzles into the re-evaporated natural gas.

Usually, natural gas contains relatively little moisture. The water dew point of natural gas is usually in the range of 0° or −5° C. In the preliminary scrubbing step, and also especially in the main scrubbing step, substantially lower temperatures are employed, e.g. about −20° to −70° C so that, prior to the entrance of the natural gas into the scrubbing columns, cooling is required to below the point of condensation of the gas. During this step, it is possible for ice or solid hydrates to precipitate and foul the heat exchange tubes. Therefore, a small amount of scrubbing agent is normally introduced into the gas prior to cooling, and the formation of ice or hydrates is prevented in this manner.

The low temperature at which the above scrubbing processes are sometimes conducted makes it also advantageous to warm the loaded scrubbing agent, prior to the addition of water, to a temperature of above 0° C.; otherwise, the water could freeze. During the course of warming from, for example, −40° or −60° C. to 0° C., a considerable portion of the gases $CH_4$, $CO_2$, and $H_2S$ dissolved in the scrubbing agent is evolved and can be withdrawn as residual gas. This residual gas is practically free of odorizers since they have a substantially higher solubility in methanol and remain substantially quantitatively dissolved even when being warmed.

The residual gas, i.e. those gases dissolved out of the natural gas during the scrubbing process and are again liberated during the regeneration of the scrubbing agent, must not be completely free of odorizers if the residual gas is to be used as domestic fuel gas, since in such a case, odorization is mandatory. Therefore, in accordance with a further embodiment of this invention, the addition of the water and of the hydrocarbons is metered in such a manner that not the total amount of odorizers is transferred to the hydrocarbon phase, but rather a certain portion, e.g. 15 to 40 percent remains dissolved in the aqueous phase. This proportion remaining in the scrubbing agent then passes into the residual gas during the course of the regeneration. Alternatively, according to another modification of the process, it is also possible to add, after a complete extraction of the odorizing substances, part of the hydrocarbon solution in metered amounts to the residual gas, instead of leaving part of the odorizing substances in the aqueous scrubbing agent phase.

Preferred polar organic scrubbing agents suitable for this invention are principally lower alkanols, such as methanol, but there can also be used lower alkyl ketones, e.g. acetone, as well as ethers, e.g. dimethyl ether, esters, e.g. ethyl acetate, amines, e.g. diethanol amine, and heterocyclics, e.g. N-methylpyrrolidone. In general, any organic polar solvent can be used so long as it is capable of dissolving $CO_2$, $H_2O$ and the odorizing compounds, and if it remains a liquid during the scrubbing process. For the preferred embodiment of the invention, the scrubbing agent is usually substantially saturated with $CO_2$ and $CH_4$ when it is employed for the preliminary removal of the odorizers; however, it is also possible to employ regenerated scrubbing agent, if desired. Generally speaking, there is utilized for the preliminary scrubbing step about 0.3 to 10, preferably 0.5 to 1 percent of the scrubbing agent used to remove $CO_2$ in the following scrubbing stage.

Suitable hydrocarbons for the extraction of the odorizing substances are liquid hydrocarbons, having a composition exhibiting a minimum average boiling point substantially equal to that of pentane. Much higher boiling hydrocarbons can also be employed, not only aliphatic hydrocarbons, but also aromatic, olefinic and naphthenic, as well as mixtures thereof, kerosene, for example, being highly suitable for the intended purpose.

Generally the hydrocarbons are suitable as soon as their freezing points are lower than about 20° C, their boiling points are higher than about 30° C, and their densities are different from the density of the mixture of water and the scrubbing agent.

One of the mostly used odorizers is butyl mercaptan, but other odorizers are also useful, e.g. other aliphatic mercaptans such as ethyl mercaptan, thioethers, cyclic sulfides such as tetrahydrothiophene, and disulfides.

It can be seen from the preceding discussion that this invention exhibits advantages as compared to the conventional methods. In particular, with natural gas liquefaction plants used to satisfy peak demands, no additional systems need by provided, such as adsorption or catalytic oxidation of the odorizers. Furthermore, no new odorizers are required for mixing with the natural gas after re-evaporation of the latter. Moreover, it is possible to effect any desired distribution of the odorizers to the residual gas and the natural gas.

BRIEF DESCRIPTION OF THE DRAWINGS

The invention will furthermore be explained in greater detail with reference to the preferred embodiments schematically illustrated in FIGS. 1 and 2, wherein.

DETAILED DESCRIPTION OF THE DRAWINGS

Figure 1:
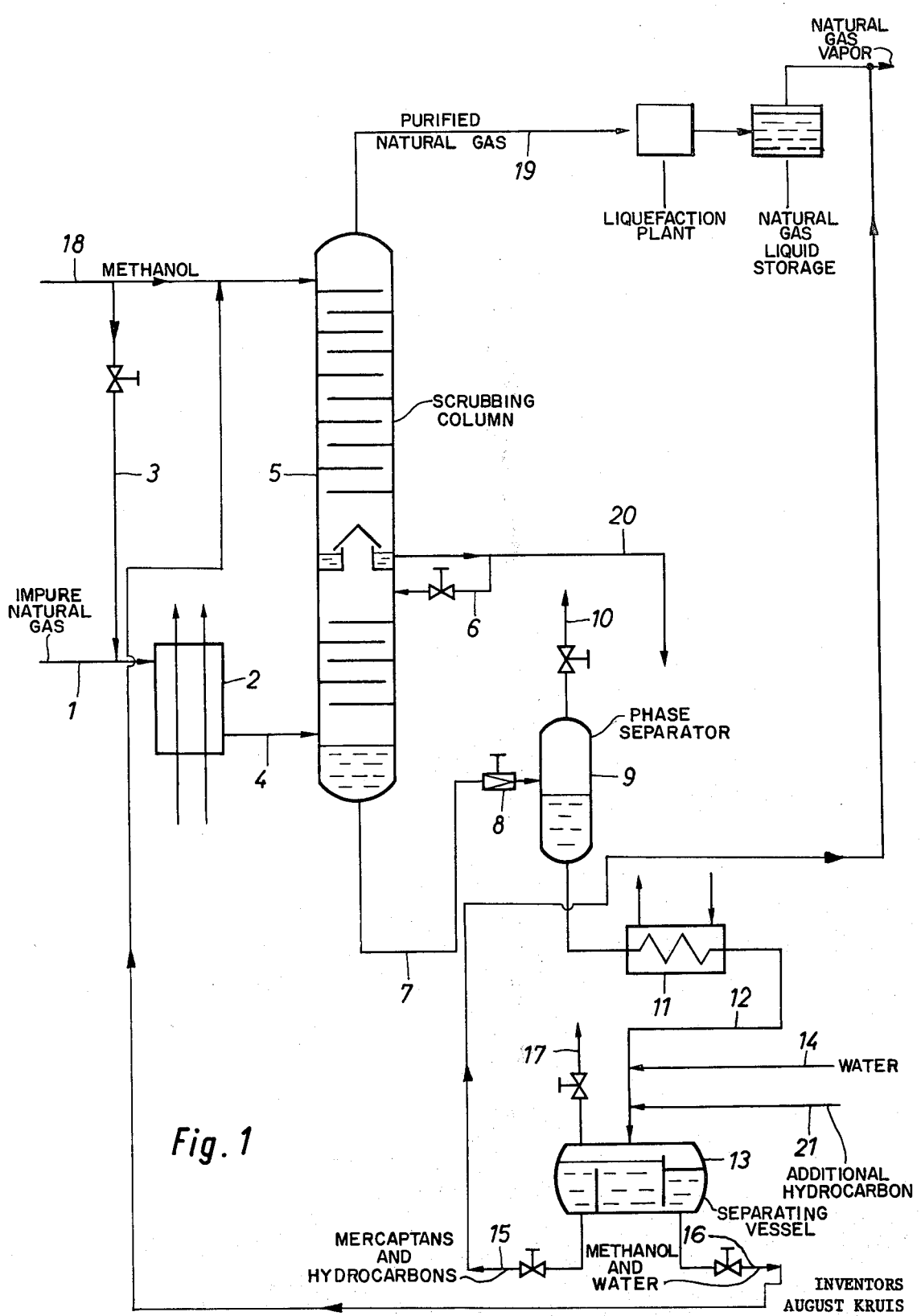
FIG. 1 depicts an plant with a two-stage scrubbing column and a separating vessel for separating the aqueous phase from the hydrocarbon phase.

For the purpose of explaining the drawings in greater detail, the following examples are presented. However, these examples are to be considered as merely illustrative and not necessarily limitative of the remainder of the disclosure in any way whatsoever.

EXAMPLE 1

This example, described with reference to FIG. 1, relates to a process wherein no liquid hydrocarbons are added to the loaded scrubbing agent, and wherein the separation of the aqueous phase from the hydrocarbon phase is conducted in a separating vessel.

Through conduit 1, 5,000 $Nm^3/h$ of natural gas containing 50 g./h of butyl mercaptan and 1 kg./h of water vapor is fed to the plant under a pressure of 45 atmospheres absolute. The gas is mixed with methanol (10 kg./h) being added through conduit 3 before entering the countercurrent irrigation heat exchanger 2, where it is cooled to −45° C. The thus-cooled gas, together with the methanol or methanol-water mixture contained therein partially in the vapor and partially in the liquid phase, then passes through conduit 4 into the lower section of a $CO_2$ scrubbing column 5.

The lower section of the scrubbing column 5 is designed as a preliminary scrubbing stage, wherein the gas is scrubbed with only a partial amount of the scrubbing agent descending in the upper section of the $CO_2$ scrubbing column, in the selected example with 500 kg./h of methanol fed to the preliminary scrubbing stage through conduit 6. The methanol passing through conduit 6 is saturated with $CO_2$ in correspondence with the temperature and the partial carbon dioxide pressure in the lower section of the scrubbing column 5, since it is branched off from the loaded scrubbing agent descending from the upper section of the $CO_2$ scrubbing column 5.

After the scrubbing agent has absorbed the butyl mercaptan contained in the natural gas and higher hydrocarbons (starting with $C_5$), it is withdrawn through conduit 7, and in order to remove the main amount of concomitantly dissolved other gases, mainly methane, it is expanded in an expansion valve 8 to 3 atm. abs., and fed to a separator 9. The concomitantly dissolved methane, as well as $CO_2$, escape through conduit 10, whereas the solution flows from the separator 9 to the heat exchanger 11, where it is warmed to about 0° C. From there, the solution passes through conduit 12 into a separating vessel 13.

Through conduit 14, 500 kg./h of water is added to the solution, so that the latter separates into an aqueous methanol phase and into a hydrocarbon phase. In the separating vessel 13, the two separated phases are carefully kept from mixing with each other. The hydrocarbon phase (25 kg./h with a methanol content of less than 0.1 percent by weight) is withdrawn through conduit 15, and the water-methanol phase (1,021 kg./h with a hydrocarbon content of less than 1 percent by weight) is discharged via conduit 16. Additional gases liberated during the warming step in heat exchanger 11, such as methane and $CO_2$, escape through conduit 17.

The hydrocarbon solution discharged through conduit 15 is stored in a suitable manner, in order to be able to return the odorizers dissolved therein to the re-evaporated natural gas, as required. The aqueous-methanolic solution discharged via conduit 16 is fed to the regenerating system.

The upper section of the $CO_2$ scrubbing column 5 is supplied with pure methanol or regenerated methanol 5,500 kg./h via conduit 18. At the head of the scrubbing column 5, via conduit 19, natural gas free of $CO_2$ and butyl mercaptan is withdrawn, which natural gas can be liquefied in a conventional liquefaction plant (not illustrated). Methanol saturated with $CO_2$ is withdrawn at the foot of the upper section of column 5 through conduit 20 and fed to the regeneration system.

In the process described in this example, there is scrubbed out 49.9 g. of the 50 g. of butyl mercaptan entering the plant with the 5,000 $Nm^3$ of natural gas. Of this amount, 27.5 g. or 55 percent by weight are present in the hydrocarbon phase, whereas 22.4 g. or 45 percent by weight are in the water-methanol phase.

EXAMPLE 2

In this example, with reference to FIG. 1, a process will be described wherein there are added to the loaded scrubbing agent, liquid hydrocarbons in addition to water.

Through conduit 1, 5,000 $Nm^3$/h of natural gas, with 50 g. of butyl mercaptan as odorant and 0.8 kg./h of water in the vapor phase, are fed to the plant under a pressure of 45 atm. abs. This mixture is cooled in the countercurrent heat exchanger 2 from 25° C. to −30° C. In order to exclude the deposition of ice or gas hydrates during this step, 10 kg./h of methanol is introduced into the still warm gas through conduit 3.

In the lower section of the scrubbing column 5, 25 kg./h of $CO_2$-saturated methanol is passed countercurrently to the cooled gas, which methanol is supplied via conduit 6. Through conduit 7, from the base of the scrubbing column, a mixture is withdrawn composed of the methanol introduced via conduit 3, the scrubbing methanol fed through conduit 6 into the lower section of the scrubbing column 5, minus the amount of methanol vaporized into the gas, 49.5 g. of scrubbed-out butyl mercaptan, and the water separated in the preliminary cooler 2.

As in the mode of operation illustrated in FIG. 1 and described in Example 1, the mixture is fed, after expansion in valve 8, to the separator 9. The gases liberated during the expansion escape via conduit 10. After warming in heat exchanger 11, 31.2 kg./h of water is fed to the scrubbing agent through conduit 14, and 5 kg./h of a liquid hydrocarbon (for example pentane) is added thereto via conduit 21. The mixture then passes into the separating vessel 13, where phase separation takes place.

In this example, the hydrocarbon phase withdrawn via conduit 15 contains 39.4 g./h or about 80 percent by weight of the thus-separated butyl mercaptan, whereas the aqueous-methanolic phase withdrawn via conduit 16 contains 10.1 g./h or about 20 percent by weight of butyl mercaptan.

EXAMPLE 3

Figure 2:
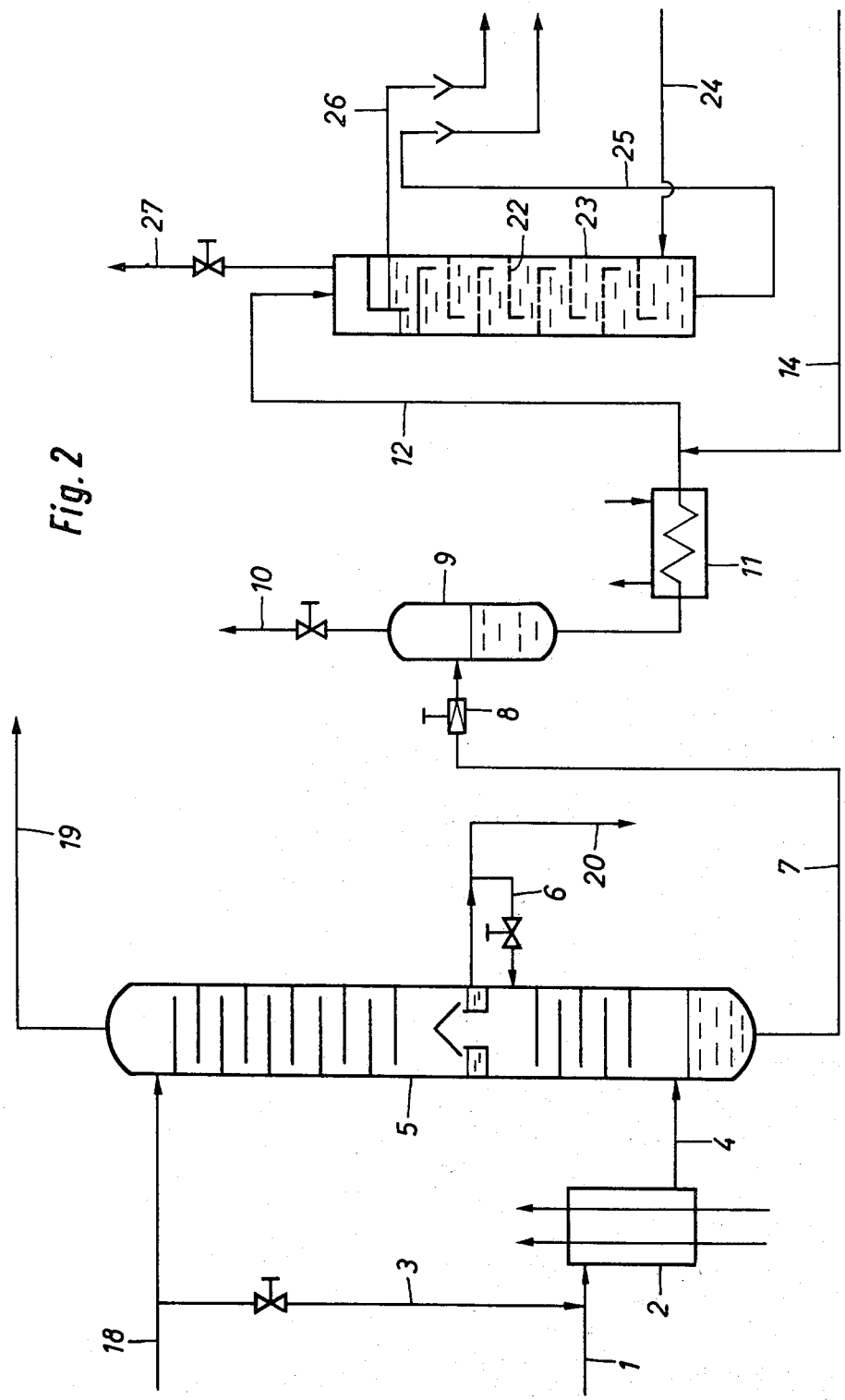
FIG. 2 shows a plant with a two-stage scrubbing column and an extraction column connected thereto.

In this example, which will be described with reference to FIG. 2, water is first added to the loaded scrubbing agent, whereafter an extraction with liquid hydrocarbons is conducted in an extraction column. In FIG. 2, those parts of the plant existing in the embodiment of FIG. 1 are denoted with identical reference numerals.

Through conduit 1, 5,000 $Nm^3$/h of natural gas is fed to the countercurrent heat exchanger 2, under a pressure of 45 atm. abs. This natural gas contains 50 g./h of butyl mercaptan as the odorizer and 0.8 kg./h of water and vapor. In the countercurrent heat exchanger 2, the gas is cooled from 25° C. to −30° C. To prevent the precipitation of ice or gas hydrates during this step, 10 kg./h of methanol is introduced via conduit 3 into the still warm gas. Through conduit 4, the cooled gas, with the methanol or methanol-water mixture contained therein partially in the vapor phase and partially in the liquid phase, passes into the lower section of the $CO_2$ scrubbing column 5.

The lower section of the scrubbing column 5 is designed as a preliminary scrubbing stage wherein the gas is scrubbed with 25 kg./h of methanol fed via conduit 6 and adjusted to the amount of odorizers contained in the gas. The scrubbing agent flowing through conduit 6 is saturated with $CO_2$ and $CH_4$ in correspondence with the temperature and the partial carbon dioxide pressure and methane pressure in the lower section of the scrubbing column 5, since it is branched off from the loaded scrubbing agent exiting from the upper section of the $CO_2$ scrubbing column. As this scrubbing agent passes down the lower section of the column, it absorbs the butyl mercaptan contained in the gas.

In the sump of the preliminary scrubbing stage, there is collected 32.9 kg./h of aqueous methanol, saturated with $CO_2$ and $CH_4$, and containing 49.5 g./h of scrubbed-out butyl mercaptan. This mixture is withdrawn via conduit 7, expanded in expansion valve 8 to 3 atm. abs., and fed to a separator 9. In this manner, the methane and $CO_2$ dissolved in the scrubbing agent is freed, withdrawn from the separator 9 via conduit 10, and can be added to the residual gas.

The liquid from separator 9 is heated in heat exchanger 11 and after being admixed with 31.2 kg./h of water through conduit 14, is fed via conduit 12 to the head of an extraction column 23 provided with perforated trays 22. Countercurrently to the descending aqueous methanol containing the odorizer butyl mercaptan dissolved therein, there is passed upwardly via conduit 24, 2 kg./h of a higher hydrocarbon (for example, pentane). The hydrocarbon, of lower specific gravity, rises in the extraction column 23 and, during this procedure, is loaded with butyl mercaptan. The resultant extracted methanol-water mixture containing only 0.5 g/h of butyl mercaptan is withdrawn from the bottom of the extraction column 23 via conduit 25 and conducted into a methanol-water separating column (not shown in the drawing), and the butyl mercaptan enters the residual gas during the regeneration of the methanol. The hydrocarbon withdrawn at the upper end of the extraction column 23 via conduit 26 contains 49 g./h or 98 percent of the butyl mercaptan and is stored until the time the liquefied natural gas is re-evaporated. Methane and $CO_2$ liberated during the extraction or by the addition of water escape via conduit 27.

The gas substantially freed of butyl mercaptan in the preliminary scrubbing stage of the scrubbing column 5 passes, through the hood provided at the head of the preliminary scrubbing stage, into the upper section of the scrubbing column 5 and is there freed of $CO_2$ by means of pure methanol supplied to the head of the scrubbing column 5 via conduit 18. Natural gas free of $CO_2$ and butyl mercaptan is withdrawn from the head of the scrubbing column 5 through conduit 19 and can be liquefied for storage purposes. The scrubbing agent collecting in the sump of the upper section of the $CO_2$ scrubbing column 5 is loaded with $CO_2$ and some $CH_4$ and, additionally, still contains 0.5 g./h of butyl mercaptan. This scrubbing agent is fed, through conduit 20, to a conventional regenerating stage (not shown in the drawing), except for that part of 25 kg./h which is branched off via conduit 6 and used as scrubbing agent in the preliminary scrubbing stage.

The regeneration of the aqueous-methanolic liquids need not be described in detail. It is apparent to a person skilled in the art that it is possible to separately regenerate the streams flowing through conduits 20 and/or 25 (in FIG. 1, 20 and 16), to discharge the gases dissolved therein as a so-called residual gas by elevating the temperature and/or lowering the pressure, or to conduct the separation of the methanol from the water by distillation. The objective and the result of these process steps will always be the complete freeing of the dissolved gases from the methanol and the substantially complete separation of the methanol from the water, so that the methanol, in purified form, can be recycled to the head of the scrubbing column 5. Then, there are combined as residual gas all those gases scrubbed out of the natural gas in the upper and lower sections of the $CO_2$ scrubbing column 5, and which have not been absorbed by the hydrocarbons discharged through conduit 26 (in FIG. 1, 15), i.e., the sum of the gases liberated during the regeneration of the streams of scrubbing agent flowing through conduits 20 and 25 (in FIG. 1, 20 and 16), together with the gases escaping through conduits 10 and 27 (in FIG. 1, 10 and 17).

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a natural gas liquefaction process comprising prior to the step of liquefying the natural gas, the preliminary steps of scrubbing the natural gas with a polar organic scrubbing agent to remove odiferous organic sulfur compounds therefrom and then in a separating step, adding water to resultant loaded scrubbing agent to form an aqueous phase and a hydrocarbon phase, the latter phase including hydrocarbons scrubbed out with said organic sulfur compounds, said organic sulfur compounds being distributed in both the aqueous and hydrocarbon phases, then liquefying and storing the scrubbed natural gas, and revaporizing same during demand periods, the improvement comprising adding additional liquid hydrocarbon, in said separating step, to said loaded scrubbing agent, in an amount to remove said organic sulfur compounds substantially completely and to transfer said organic sulfur compounds to said hydrocarbon phase, and recycling resultant liquid hydrocarbon phase containing said organic sulfur compounds to the scrubbed natural gas.

2. A process according to claim 1, wherein the scrubbing agent is substantially saturated with $CO_2$ and $CH_4$ prior to being employed in said scrubbing step.

3. A process according to claim 1, wherein the scrubbing step is conducted at below about 0° C. and scrubbing agent is introduced into the natural gas prior to its being cooled to the scrubbing temperature, to prevent the deposition of ice and/or gas hydrates.

4. A process according to claim 1, wherein the recycling of the organic sulfur compounds to the natural gas is conducted by stripping the liquid hydrocarbon phase containing the organic sulfur compounds with a partial stream of the stored natural gas, said stream being a vapor.

5. A process according to claim 1, wherein the recycling of the organic sulfur compounds to the natural gas is conducted by spraying the hydrocarbon phase containing the organic sulfur compounds into the stored natural gas, as the latter is revaporized from storage zone.

6. A process according to claim 1, said separating step comprising first adding water to the loaded scrubbing agent, and then countercurrently extracting resultant aqueous scrubbing agent with the added liquid hydrocarbons.

7. A process according to claim 1, wherein said polar organic scrubbing agent is methanol.

8. A process according to claim 3, wherein said polar organic scrubbing agent is methanol.

9. A process according to claim 1, said polar organic scrubbing agent is selected from the group consisting of lower alcohols, ketones, ethers, esters, and amines.

10. A process according to claim 1, wherein said polar organic scrubbing agent is N-methylpyrrolidone.

11. A process according to claim 1, wherein said added liquid hydrocarbons have an average minimum boiling point of about that of pentane.

12. A process according to claim 1, wherein the liquid hydrocarbon is kerosene.

13. Apparatus for conducting a preliminary purification of natural gas prior to liquefaction thereof, said apparatus comprising a scrubbing column (5) equipped with feed lines for impure natural gas (4), pure scrubbing agent (18), and a conduit (19) for the withdrawal of scrubbed natural gas, said column having a base provided with conduit in communication with liquid phase separator means, (13 or 23), and additional feed lines for water (14) and liquid hydrocarbons (21) being provided in communication with said latter conduit between the scrubbing column (5) and the separator means (13 or 23), said scrubbing column (5) being a two-stage scrubbing column, wherein the base of the lower section of the scrubbing column (5) is in communication with the phase separator means (13 or 23), and the head of the lower section of the scrubbing column is in communication with the base of the upper section of the scrubbing column via conduits (6, 20) for the liquid.

14. Apparatus according to claim 13, said scrubbing column (5) being a two-stage scrubbing column, wherein the base of the lower section of the scrubbing column (5) is in communication with the phase separator means (13 or 23), and the head of the lower section of the scrubbing column is in communication with the base of the upper section of the scrubbing column via conduits (6, 20) for the liquid.

15. Apparatus according to claim 13, said phase separator means being in extraction column (23).

16. Apparatus according to claim 15, comprising conduits (7, 12) extending between the base of the lower section of the scrubbing column (5) and the extraction column (23) terminating at the head of the latter, and a feed conduit (24) for the liquid hydrocarbons terminating in the lower section of the extraction column.

17. A process according to claim 1 wherein said organic sulfur compounds are recycled to the scrubbed natural gas after said scrubbed natural gas has been liquefied and revaporized.

* * * * *